United States Patent [19]
Hasebe

[11] 3,790,833
[45] Feb. 5, 1974

[54] SYNCHRONOUS MOTOR
[75] Inventor: Sukehiro Hasebe, Sukagawa, Japan
[73] Assignee: Kabushiki Kaisha Koparu, Yokyo, Japan
[22] Filed: May 24, 1973
[21] Appl. No.: 363,316

[30] Foreign Application Priority Data
  May 26, 1972  Japan.............................. 47/52357
  May 26, 1972  Japan.............................. 47/52358

[52] U.S. Cl.................. 310/162, 310/103, 310/114
[51] Int. Cl................................................... H02k
[58] Field of Search ..... 310/103, 104, 99, 152, 114, 310/126, 41, 163, 162, 268, 156, 106, 112, 108, 109, 264

[56] References Cited
UNITED STATES PATENTS
3,523,204  8/1970  Rand................................. 310/103
3,400,287  9/1968  Huff................................... 310/103
850,926  4/1907  Gury.................................... 310/41
1,950,898  3/1934  Mansfield............................ 310/41
2,081,800  5/1937  Dunham et al. .................... 310/156
2,024,161  12/1935  Griffiths.............................. 310/156

Primary Examiner—J. D. Miller
Assistant Examiner—Pat Salce
Attorney, Agent, or Firm—John W. Malley et al.

[57]  ABSTRACT

A non-self-starting type synchronous motor comprises a pair of permanent-magnet rotors rotatable in directions opposite to each other by means of magnetic coupling in order to prevent the rotational motion of the rotators from being stopped by step-out of the synchronous motion because of vibration or impact and also a field coil for giving a turning force to said pair of rotors.

3 Claims, 2 Drawing Figures

SYNCHRONOUS MOTOR

BACKGROUND OF THE INVENTION a. Field of the Invention

The present invention relates to a synchronous motor and, more particularly, to a non-self-starting synchronous motor which does not stop its rotation even when subjected to any kind of vibration or impact.

b. Description of the Prior Art:

Generally, a non-self-starting type synchronous motor is arranged to enter synchronous rotation by rotating its rotor by a mechanical device when starting. If, however, the motor itself is subjected to vibration or impact especially in tangential direction of the rotor shaft during synchronous rotation, the synchronous motion tends to be disturbed and, as a result, the rotor stops by step-out of the synchronous motion, thus unexpected trouble occurs in practical use.

SUMMARY OF THE INVENTION

It is, therefore, the principal object of the present invention to provide a non-self-starting type synchronous motor having a pair of permanent-magnet rotors arranged adjacent to each other and rotatable in directions opposite to each other because of magnetic coupling, said pair of rotors being arranged to perform synchronous rotation by a field coil or field coils, thus said synchronous motor not stopping its rotation, even when subjected to vibration or impact, by offsetting step-out of synchronization involved in vibration or impact by means of said pair of rotors.

Another object of the present invention is to provide said type of synchronous motor with simple construction arranged to enter synchronous rotation without fail when starting.

Other objects and advantages of the present invention will become evident by the following detailed description according to embodiments of the present invention illustrated in the accompanying drawings.

DETAILED DESCRIPTION OF THE PREFERRED EMBODIMENTS

Figure 1:
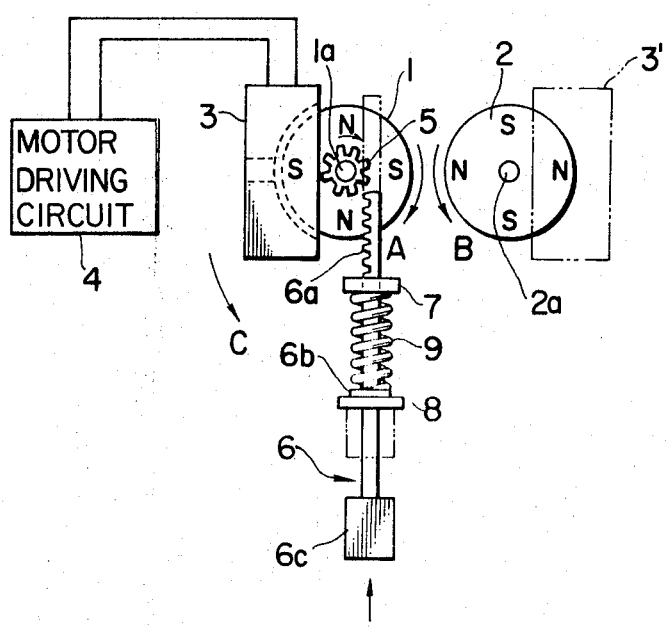
FIG. 1 shows the construction drawing of the main part of an embodiment of the synchronous motor according to the present invention.

In FIG. 1, numerals 1 and 2 designate permanent-magnet rotors having rotor shafts 1a and 2a rotatably born respectively by a motor case which is not illustrated here and also having for example four magnetic poles arranged adjacent to each other so that said magnetic poles will be magnetically coupled with each other.

The rotor shaft 1a is connected to the driven device through a suitable gear train not illustrated here. The other rotor shaft 2a is connected to another driven device through another gear train of the same kind or is left free. Numeral 3 designates a field coil mounted to the motor case so that said magnetic coil embraces a part of the rotor 1. Numeral 4 designates a motor driving circuit for supplying the driving current, which is regulated by an oscillator, to the field coil 3. Numeral 5 designates a pinion mounted to the rotor shaft 1a so that said pinion rotates together with said rotor shaft 1a when rotated in arrowhead direction and becomes free when rotated in anti-arrowhead direction. Numeral 6 designates an operating rod which is slidably guided by fixed guides 7 and 8 and is provided with a rack 6a, which can mesh with the pinion 5, on one end and with a button 6c on the other end. Numeral 9 designates a coil spring which is positioned between the guide 7 and spring shoe 6b fixed to the operating rod 6. The pinion 5 and operating rod 6 compose a mechanical starting device of the motor.

The operation of the above embodiment is as described below.

When the motor driving circuit is put to actuated condition and the button 6c is pushed in the arrowhead direction, the operating rod 6 slides by compressing the coil spring 9, the rack 6a meshes with the pinion 5 and makes the pinion 5 turn in free condition in anti-arrowhead direction, thus the operationg rod 6 comes to the position shown by the one-dot chain line. When the button 6c is released in the above condition, the operating rod 6 quickly returns to the position shown by the full line because of the force of restitution of the coil spring 9. By this returning motion of the operating rod 6, the pinion 5 is quickly turned in arrowhead direction and makes the rotor 1 turn in the direction shown by the arrowhead A. After a certain time, the rotor 1 is brought into the synchronous rotation by the field coil 3 and rotates continuously. At that time, the other rotor 2 rotates continuously in the direction shown by the arrowhead B, that is, the direction opposite to the rotating direction of the rotor 1, also in synchronous condition, because of magnetic coupling with the rotor 1.

If the motor as a whole is subjected to an impact in the direction shown in the arrowhead C when rotors 1 and 2 are rotating continuously as described above, rotating speed of the rotor 1 increases instantaneously and rotating speed of the rotor 2 decreases also instantaneously. If said impact is applied when rotors 1 and 2 are in the relative position as illustrated in FIG. 1, said impact acts on the rotor 1 as a power to advance the rotor 1 in the direction shown by the arrowhead A, and on the other hand, acts on the rotor 2 as a force to make it return in the direction opposite to the arrowhead B. That is, the S pole of the rotor 1 tends to go apart from the N pole of the rotor 2. However, as these magnetic poles have the tendency to come to conditions that their magnetic coupling is strongest, rotors 1 and 2 maintain the condition as illustrated and, as a result, step-out by said impact is offset. Thus, rotors 1 and 2 continue their rotation without stopping. The above-mentioned effect is obtained in the same way even when the motor as a whole is subjected to vibration in tangential direction of the rotor shaft.

In the embodiment shown in FIG. 1, the mechanical starting device is arranged so that it works only on the rotor shaft 1. But, it is of course possible to arrange so that said mechanical starting device works also on the rotor 2 at the same time. Besides, it is possible to provide a field coil 3' as shown by the one-dot chain line in FIG. 1 for the rotor 2 in the same way as the field coil 3. In that case, however, field coil 3 and 3' have to be energized in the same phase. When the field coils are provided to both rotors respectively, it becomes easier to put the motor to the synchronous rotation when starting.

Figure 2:
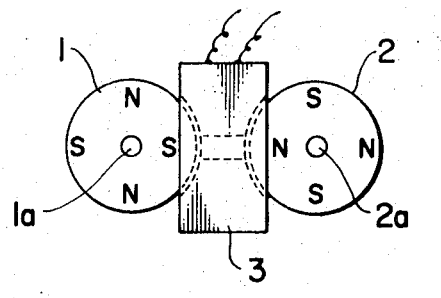
FIG. 2 shows the construction drawing of the main part of another embodiment of the synchronous motor according to the present invention.

FIG. 2 shows another embodiment of the present invention for which the position of the field coil 3 relative to rotors 1 and 2 is different from that of the embodiment shown in FIG. 1. As the other arrangement and operation are same as those of the embodiment shown in FIG. 1, detailed description is omitted. In the embodiment shown in FIG. 2, the field coil 3 is positioned between permanent-magnet rotors 1 and 2. Consequently, a magnetic path is caused between these rotors 1 and 2, and the amount of magnetic flux shorted on the peripheral surface of each rotor becomes small and more magnetic flux works effectively on the field coil. Thus, it is possible to provide this kind of synchronous motor with still higher efficiently.

I claim:

1. A non-self-starting type synchronous motor comprising a first permanent-magnet rotor having a plural number of magnetic poles, a field coil arranged adjacent to said first permanent-magnet rotor embracing a part of said first permanent-magnet rotor, and a second permanent-magnet rotor having the same number of magnetic poles as said first permanent-magnet rotor and arranged adjacent to said first permanent-magnet rotor so that said second permanent-magnet rotor rotates in direction opposite to said first permanent-magnet rotor being magnetically coupled with said first permanent-magnet rotor.

2. A non-self-starting type synchronous motor according to the claim 1 further comprising a field coil arranged adjacent to said second permanent-magnet rotor embracing a part of said second permanent-magnet rotor.

3. A non-self-starting type synchronous motor comprising a first permanent-magnet rotor having a plural number of magnetic poles, a second permanent-magnet rotor having the same number of magnetic poles as said first permanent-magnet rotor and arranged adjacent to said first permanent-magnet rotor so that said second permanent-magnet rotor rotates in direction opposite to said first permanent-magnet rotor being magnetically coupled with said first permanent-magnet rotor, and a field coil arranged between said first and second permanent-magnet rotors embracing a part of said first and second permanent-magnet rotors respectively.

* * * * *